(12) United States Patent
McTaggart et al.

(10) Patent No.: US 11,546,206 B2
(45) Date of Patent: Jan. 3, 2023

(54) ROBOTIC PROCESS AUTOMATION BOT OPERATIONAL MANAGEMENT SYSTEM

(71) Applicants: AT&T Intellectual Property I, L.P., Atlanta, GA (US); AT&T Digital Life, Inc., Atlanta, GA (US)

(72) Inventors: Rodney McTaggart, Kaufman, TX (US); David Roth, Plano, TX (US)

(73) Assignees: AT&T DIGITAL LIFE, INC., Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/094,406

(22) Filed: Nov. 10, 2020

(65) Prior Publication Data

US 2022/0150106 A1    May 12, 2022

(51) Int. Cl.
*H04L 41/0677*  (2022.01)
*H04L 41/5009*  (2022.01)
*H04L 41/0686*  (2022.01)
*H04L 41/046*   (2022.01)
*H04L 41/50*    (2022.01)

(52) U.S. Cl.
CPC ........ *H04L 41/0677* (2013.01); *H04L 41/048* (2013.01); *H04L 41/0686* (2013.01); *H04L 41/5009* (2013.01); *H04L 41/5096* (2013.01)

(58) Field of Classification Search
CPC ............... H04L 41/0677; H04L 41/048; H04L 41/0686; H04L 41/5009; H04L 41/5096; H04L 41/046; H04L 41/0681; H04L 41/0695; H04L 41/5019; G06F 9/38; G06F 9/50; G06F 15/18; G06F 11/3495; B25J 9/1674; B25J 9/0084; G05B 2219/50391; G05B 13/028; G05B 13/041; G05B 19/042
See application file for complete search history.

(56) References Cited

U.S. PATENT DOCUMENTS 10,270,644 B1 *  4/2019  Valsecchi ............ H04L 41/0654
10,313,179 B1 *  6/2019  Douberly ............. H04L 67/325
10,623,233 B1 *  4/2020  McConnell ............ H04L 43/08
(Continued)

OTHER PUBLICATIONS

Rehan Syed et al., Robotic Process Automation: Contemporary themes and challenges, Queensland University of Technology, Australia (Year: 2019).*

*Primary Examiner* — Joseph L Greene
(74) *Attorney, Agent, or Firm* — Guntin & Gust, PLC; Kenneth Kwan

(57) ABSTRACT

A device includes a processor and a memory. The processor effectuates operations including monitoring enterprise network traffic associated with one or more user device (UE). The processor further effectuates operations including comparing the enterprise network traffic to a UE profile associated with each of the one or more UE. The processor further effectuates operations including determining whether the comparison indicates that a predetermined threshold has been exceeded. The processor further effectuates operations including in response to the indication that the predetermined threshold has been exceeded, generating an alert, wherein exceeding the predetermined threshold is indicative of a denial of service attack on an enterprise network or an attempt to remove enterprise data via the one or more UE.

20 Claims, 17 Drawing Sheets

(56) References Cited

U.S. PATENT DOCUMENTS

| | | | |
|---|---|---|---|
| 11,218,594 B1* | 1/2022 | Sekar | G06F 40/35 |
| 2010/0296417 A1* | 11/2010 | Steiner | H04L 67/1002 |
| | | | 370/260 |
| 2019/0126463 A1* | 5/2019 | Purushothaman | G06N 20/00 |
| 2019/0155225 A1* | 5/2019 | Kothandaraman | G06N 20/00 |
| 2019/0286736 A1* | 9/2019 | Sturtivant | G06F 16/2358 |
| 2019/0287063 A1* | 9/2019 | Skaaksrud | G06Q 10/0832 |
| 2019/0303232 A1* | 10/2019 | Antonio | G06F 11/3065 |
| 2020/0306970 A1* | 10/2020 | Latkar | G06F 11/0709 |
| 2021/0334817 A1* | 10/2021 | Boston | G06Q 30/016 |

* cited by examiner

```
Digital Life RPA C&CT(6:20:56 AM):

Scheduled Run Time - Failed to Start

Start Time   Bot Name/Mech ID/HVD Name
 6:00 AM      Ping_RT_rx5660
              m18486 - HVDIID09ALH0058

Digital Life RPA C&CT(7:00:01 AM):

HVDs Offline

HVDIID09ALH0058 - m18486 - 6/19: Upgraded AA 10.5.112
Digital Life RPA C&CT(10:00:02 AM):
RPA CCC Tool: Yoda Errors Date/Time       MechID       Error
07/29/2020                   Cannot find window or application titled 'Email Address
14:44:12        m18505       Details - *' that was open during recording.

Brief Error
                Text:         Window does not exist - Email

Recommended
                Action:       Clear & Restart HVD
```

FIG. 12

| | | | | |
|---|---|---|---|---|
| 1594 WFE_Clarify_m1252x_615am | 1594 WFE_TO... | HVDIID09ALH... | Daily | Every day at 06:15 (Central Stand... |
| 1594 WFE_Clarify_m1848x_630am | 1594 WFE_TO... | HVDIID09ALH... | Daily | Every day at 06:30 (Central Stand... |
| 1594 WFE_Clarify_m1976x_635am | 1594 WFE_TO... | HVDIID09ALH... | Daily | Every day at 06:35 (Central Stand... |
| 1594 WFE_Clarify_m2248x_625am | 1594 WFE_TO... | HVDIID01CAH... | Daily | Every day at 06:25 (Central Stand... |
| 1594 WFE_Clarify_m2504x_620am | 1594 WFE_TO... | HVDIID01CAH... | Daily | Every day at 06:20 (Central Stand... |
| 1594 WFE_Clarify_m2505x_640am | 1594 WFE_TO... | HVDIID01CAH... | Daily | Every day at 06:40 (Central Stand... |

FIG. 13

| Start Time | Bot Name/Mech ID/HVD Name |
|---|---|
| 6:00 AM | Ping_RT_rx5660 |
| | m18489 - HVDIID09ALH1821 |
| | m18494 - HVDIID09ALH1890 |
| | m18504 - HVDIID09ALH0083 |
| | m19761 - HVDIID09ALH1745 |

FIG. 14A

```
Digital Life RPA C&CT(7:00:05 AM):

HVDs Offline

HVDIID09ALH0083 - m18504 - 6/10: Upgraded AA 10.5.112
HVDIID09ALH1745 - m19761 - 12:26: Logs Enabled
HVDIID09ALH1821 - m18489 - 6/19: Upgraded AA 10.5.112
HVDIID09ALH1890 - m18494 - 6/19: Upgraded AA 10.5.112
```

```
┌─────────────────────────────────────┐
│ Generate or otherwise deploy one or │
│ more BOTs in a telecommunications   │
│ network                             │
│ 1605                                │
└─────────────────────────────────────┘
                  │
                  ▼
┌─────────────────────────────────────┐
│ Start the one or more BOTs          │
│ 1610                                │
└─────────────────────────────────────┘
                  │
                  ▼
┌─────────────────────────────────────┐
│ Perform database update for the one │
│ or more BOTs                        │
│ 1615                                │
└─────────────────────────────────────┘
                  │
                  ▼
┌─────────────────────────────────────┐
│ Analyze a status associated with    │
│ each of the one or more BOTs        │
│ 1620                                │
└─────────────────────────────────────┘
                  │
                  ▼
┌─────────────────────────────────────┐
│ Provide status analysis outputof    │
│ the one or more BOTs via a BOT      │
│ management dashboard                │
│ 1625                                │
└─────────────────────────────────────┘
                  │
                  ▼
┌─────────────────────────────────────┐
│ Manage the one or more BOTs based   │
│ on status analysis associated with  │
│ each of the one or more BOTs        │
│ 1630                                │
└─────────────────────────────────────┘
```

FIG. 16

ROBOTIC PROCESS AUTOMATION BOT OPERATIONAL MANAGEMENT SYSTEM

TECHNICAL FIELD

This disclosure is directed to a system and method for managing telecommunications networks, and, more specifically, to managing robotic application processes operating in networks.

BACKGROUND

Service providers are able to provide a broad array of network-based services that include video, telephone, cellular, data and other services. Such services require extensive network infrastructure and customer premises equipment, which increases the vulnerability of such services to outages and other disruptions. Service providers may troubleshoot network technologies or equipment and repair of network-based services. The service providers may employ BOTs (e.g., robotic process automation (RPA) or computer-generated agents) to run automated tasks within the network. For example, the service providers may use computer-generated agents to provide a rudimentary monitoring for the network technologies and equipment in order to obtain insight into operations. The computer-generated agents may provide information that may be used during troubleshooting or repair. Other business types other than service providers may also use computer-generated agents to perform automated tasks.

This background information is provided to reveal information believed by the applicant to be of possible relevance. No admission is necessarily intended, nor should be construed, that any of the preceding information constitutes prior art.

SUMMARY

Disclosed herein is a device having a processor and a memory coupled with the processor. The processor effectuates operations including deploying one or more robotic process automation (RPA) BOTs in a telecommunications network. The processor further effectuates operations including updating, for the one or more RPA BOTs, a database with BOT information comprising at least one of: BOT status update information, a debug log, or BOT operations. The processor further effectuates operations including analyzing a status of the one or more RPA BOTs based on updating the database. The processor further effectuates operations including managing the one or more RPA BOTs based on the status.

Disclosed herein is a computer-implemented method. The computer-implemented method includes deploying one or more robotic process automation (RPA) BOTs in a telecommunications network. The computer-implemented method further includes updating, for the one or more RPA BOTs, a database with BOT information comprising at least one of: BOT status update information, a debug log, or BOT operations. The computer-implemented method further includes analyzing a status of the one or more RPA BOTs based on updating the database. The computer-implemented method further includes managing the one or more RPA BOTs based on the status.

Disclosed herein is a computer-readable storage medium storing executable instructions that when executed by a computing device cause said computing device to effectuate operations including deploying one or more robotic process automation (RPA) BOTs in a telecommunications network. Operations further include updating, for the one or more RPA BOTs, a database with BOT information comprising at least one of: BOT status update information, a debug log, or BOT operations. Operations further include analyzing a status of the one or more RPA BOTs based on updating the database. Operations further include managing the one or more RPA BOTs based on the status.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 6 is an exemplary dashboard in accordance with the present disclosure;

FIG. 7 is an exemplary dashboard in accordance with the present disclosure;

FIG. 10 is an exemplary dashboard in accordance with the present disclosure;

FIG. 11 is an exemplary dashboard in accordance with the present disclosure;

FIG. 12 is an exemplary dashboard in accordance with the present disclosure;

FIG. 13 is an exemplary dashboard in accordance with the present disclosure;

FIG. 14A is an exemplary dashboard in accordance with the present disclosure;

FIG. 14B is an exemplary dashboard in accordance with the present disclosure;

FIG. 16 is a flowchart of an exemplary method of operation for the architecture in accordance with the present disclosure;

DETAILED DESCRIPTION

Network support sites can have various degrees of complexity. A telecommunications network may include equipment with substantially disparate functionality and operational and maintenance requirements. In addition, network sites may provide telecommunication signals according to various technology protocols and operate disparate ensuing equipment. Thus, conventional management of complex network sites readily becomes cumbersome and cost ineffective in view of the various device-specific interfaces and applications, and communication links.

Conventional telecommunications network management or general business management provide no insight, real-time or otherwise, into robotic application processes (RPA) BOTs, hereinafter "BOTs", operating (e.g., batch record processing, reporting, virtual agent, or data entry/retrieval) within the telecommunications network or manage automation, an individual BOT or multiple BOTs, at a level to effectively produce expected and consistent results. Also, the current telecommunications network management provides no visibility into how successful BOTs are running and what errors are occurring. Additionally, the current telecommunications network management fail to provide alerts when key performance indicators (KPIs) thresholds for any of the BOTs have been crossed. Moreover, BOT management is tedious because technicians often have to manually test bot operations, which is time consuming.

Accordingly, BOT failures, BOT interruptions, BOT underutilization, BOT over utilization, poor BOT performance, etc., may not be known leading to delays in or failure to address telecommunications network issues, which could result in poor network performance. By obtaining status information for BOTs, which could be real-time status information, troubleshooting or reporting for BOTs within the telecommunications network may occur faster.

The present disclosure includes providing operational oversight of robotic process automation (RPA) BOTs running in a telecommunications network, which provide insight into RPA BOTs processes. Accordingly, this insight may be utilized to perform BOT management of the RPA BOTs.

Figure 1:
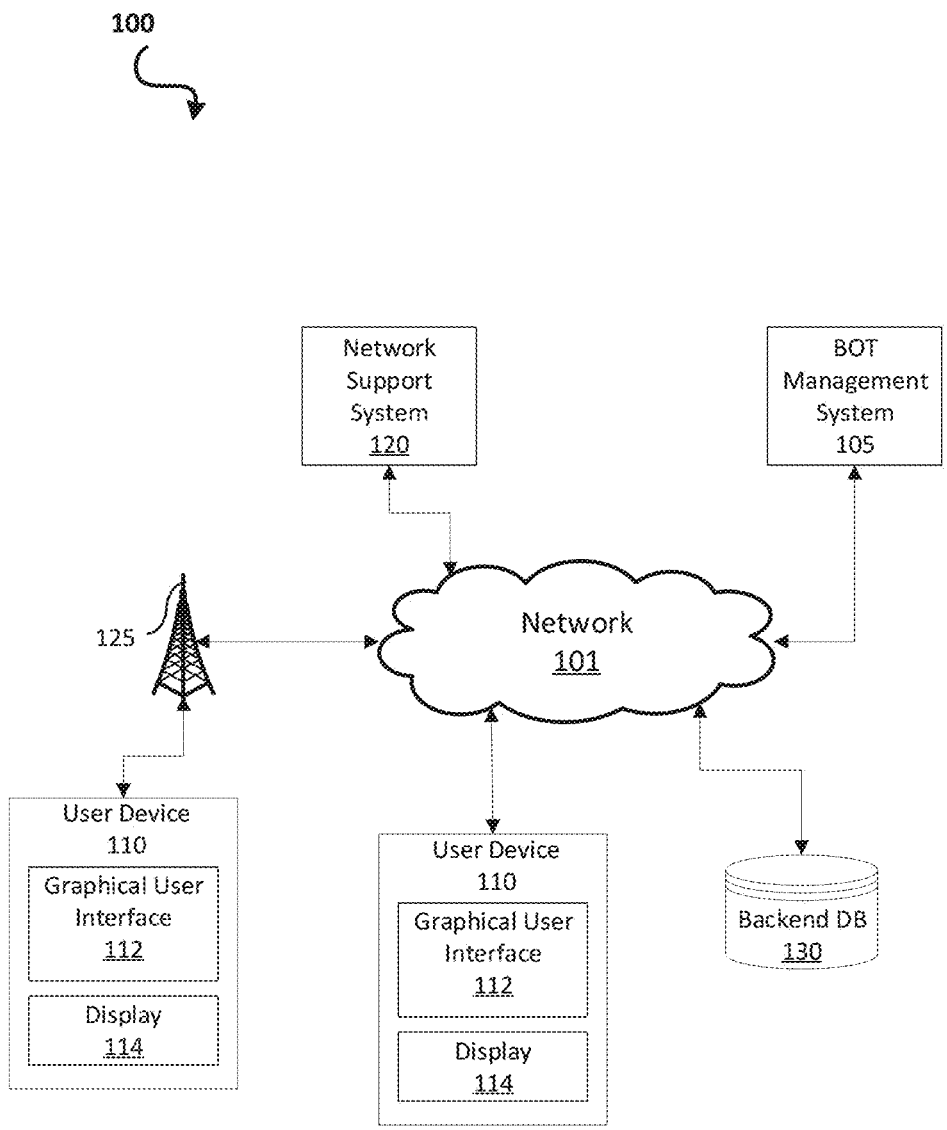
FIG. 1 is a block diagram of an exemplary operating environment in accordance with the present disclosure.

FIG. 1 illustrates an example telecommunication system 100 that may be utilized to facilitate operational management processes according to an exemplary embodiment of the present disclosure. As shown in FIG. 1, user device (UE) 110 may request a service, execute an application, perform an operation, provide status information, or the like, via radio access technology 125 (e.g., an LTE RAN or 5G RAN) and a telecommunications network 101. As depicted in FIG. 1, UE 110 may comprise any appropriate type of user device, such as, for example, a tablet, personal computer, a laptop computer, or a mobile device, or the like. The UE 110 may include a display 114 and a graphical user interface 112. In some example embodiments, data may be provided to the graphical user interface 112 (e.g., for presentation/output) by a communication device (e.g., the network support system 120, the BOT management system 105, the backend database 130, etc.).

The UE 110 may include a graphical user interface 112. In some example embodiments, the graphical user interface 112 may include an input and display interface that may be used to interact with tools that allow users to manage robotic application processes in real-time. Robotic application processes may provide process automation using software robots (BOTs), as well as artificial intelligence. The BOTs may perform tasks ranging from helping technicians activate equipment for customers, aggregating data for service orders, customer service reports, scanning phone calls, compiling network traffic reports, creating engineering work orders, and updating systems for network-boosting activities, or other network related operations. Robotic process automation (RPA) is the application of configured software that allows computer software or a "robot" to capture and interpret existing applications for processing a transaction, manipulating data, triggering responses, or communicating with other digital systems. In some other example embodiments, the user input interface may detect input and selection of a workflow for generating and managing robotic application processes, which are further described below. It is to be understood that the UE 110 as depicted in FIG. 1 is exemplary and not intended to be limiting.

UE 110 may gain access to the telecommunications network 101 via any appropriate mechanism. For example, as depicted in FIG. 1, access to the telecommunications network 101 may be provided via cellular infrastructure, Wi-Fi infrastructure, hot spots, or the like, or any appropriate combination thereof.

The telecommunications communication network 101 may include a software defined network (SDN). The SDN network may be controlled by one or more SDN controllers. For example, the SDN network may include an SDN controller. The SDN controller may be a computing system executing computer executable instructions and/or modules to provide various functions. In one or more embodiments, multiple computer systems or processors may provide the functionality illustrated and described herein with respect to the SDN controller. The SDN controller may include various components and/or can be provided via cooperation of various network devices or components. For example, SDN controller may include or have access to various network components or resources, such as a network resource controller, network resource autonomous controller, a service resource controller, a service control interpreter, adapters, application programming interfaces, compilers, and network data collection and/or analytics engine (not shown). The SDN controller may also include access information describing available resources and network information, such as network objects statistics, events or alarms, topology, and state changes. The SDN controller may use, generate, or access system configurations, including configuration of resources available to the SDN controller for providing access to services.

The telecommunications communication network 101 may be provided with a common control plane function. The common control plane can capture traffic entering the telecommunications communication network 101 from various communication devices (e.g., UE 110) that enters the telecommunications network 101 via one or more air interfaces.

The SDN Controller is an application in a software-defined network that manages flow control to enable intelligent networking. The SDN controller may allow servers to tell switches where to send packets. The SDN controller may also analyze requested services to determine the service functions and or network data flows that would be required to facilitate delivery of the services to the UE 110.

The SDN controller may determine what specific network functions are required to facilitate services requested from the UE 110. The SDN controller may also analyze policies for the requested services. The policies may include network engineering rules, which can be defined by a network designer, engineer (e.g., network support engineer or technician), business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

The network support system 120 may be associated with platforms that aid telecommunications service providers in managing networks, customer services, customer experience, service provisioning, network configuration, fault management, inventory management, and order management. Network engineers and network specialist may interact with the network support system 120 to monitor, analyze, maintain, troubleshoot, and evaluate computer network problems. The network support system 120 may be used to generate workflows including workflow information, via, for example, a workflow management interface, and allow network support staff to use the workflow information to create work orders, open service tickets, and otherwise schedule technical support for a variety of network devices and systems. The workflow information may be generated at various times. The workflow information may indicate resources associated with a process, how capacity of the resources is used to perform the process, times during the process at which the capacity changes begin, occur, end, combinations thereof, or the like. The workflow information may be stored in a flat file, which may be transmitted to the BOT management system 105. Workflows (e.g., a platform that provides instructions to BOTs as they work to obtain insight into network or business operations in accordance with the instructions provided) may be used to address a variety of problems or obtain a variety of information, for example, problem resolution flows, home diagnostic flows, network diagnostic flows, or any combination thereof.

The BOT management system 105 may include one or more virtual machines (VMs). Each VM may encapsulate a complete set of virtual hardware resources, including an operating system and all its applications, inside a software package. The VMs may be operated in a headless mode thereby allowing the virtual machine to run in the background. Because the VMs operate in a headless environment, visibility into BOT operations is limited because BOT operations also run in the background and are not visible (e.g., via a graphical user interface).

The BOT management system 105 may receive one or more flat files from the network support system 120. The BOT management system 105 may use the VMs to generate, monitor, control and provide remote management of BOTs.

The BOTs may be generated as virtual instances (e.g., Virtual Network Functions (VNFs), VMs or virtual network resources), which may be used to perform automated tasks to or within the telecommunications communication network 101 assigned by network support staff which may be based on pre-defined rules and instructions. The BOTs may perform tasks, such as helping technicians activate equipment for customers, aggregating data for service orders and customer service reports, creating engineering work orders, or updating systems for network-boosting activities. For example, BOTs may be used to scan phone calls to customer service and compile network traffic reports. The tasks may be one or more actions to be performed to the network or to one or more BOTs (e.g., start BOT, stop BOT, schedule BOT, monitor BOT, reboot BOT, update BOT, clear hung session, BOT run record success/fail, how successful is a BOT running, what is causing BOT failures, what is causing a record processing failure, determine whether to identify input data is in place, identify whether a hosted virtual disk (HVD) is ready for use, identify whether a HVD is logged into a BOT server, identify whether a BOT is ready to run, identify key performance indicators (KPIs) per BOT, identify errors in real-time, identify record failure causes, identify captured failed records, automate a fallout rerun (KPI), perform BOT analytics, debug analytics, and reboot server or HVD). The BOTs may also be used to collect and analyze data from the network and the resources and functions, and compare the data to engineering rules, policies, network maps, SLAs, and other analytics to determine how performance compares to desired standards.

The user device 110 may utilize the graphical user interface 112 (e.g., a dashboard providing a screen that receives and displays information) to enable an operator to search on a wide range of parameters in the database. For example, the user device 110 may be used to search for or otherwise manage the BOTs based on, for example, a BOT status, BOT location, BOT KPI, BOT failure, BOT analytics, etc. The BOT status may be, for example, start, stop, scheduled, running, etc. The BOT status, BOT location, BOT KPI, BOT failure, and BOT analytics may be stored in the backend database 130. The graphical user interface 112 may be used to visualize a variety of aspects that provides visibility into the operation of BOTs that have been deployed within the telecommunications communication network 101. For example, the graphical user interface 112 may display a dashboard for at least one of: a BOT schedule, a start/stop BOT status, running BOT view, view of records being processed, view of success/fail processing for each record, BOT KPI with KPI alerting, real-time reporting and analytics, BOT errors, BOT performance, HVD readiness, HVD capacity management, record based call-driver dashboard, mobile application testing BOT, BOT management email/messenger alerting.

Accordingly, the BOT management system 105 may be used to manage one or more BOTs running on one or more HVDs (e.g., 30 HVDs). The user device 110 may be utilized to provide a real-time view of the BOTs running, what the BOTs are running, and how well the BOTs are performing.

The backend database 130 may be used to store a variety of information generated or received by the network support system 120, BOT management system 105, and user device 110. The backend database 130 may store information relating to tasks that have been performed in the past by BOTs. The backend database 130 may include a repository of tasks and a repository of feedback associated with one or more BOTs. The repository of tasks may include information about previously performed tasks. This information may include the nature of the task performed, which BOT performed the task, the time at which the task was performed, etc. The repository of feedback may include feedback from network support staff in response to the tasks performed. For instance, this feedback may indicate whether the tasks were completed to satisfaction or whether improvements for completing the tasks are needed. Feedback may also indicate whether any problems were encountered in performing the tasks and what actions were taken to resolve the problems.

Figure 2:
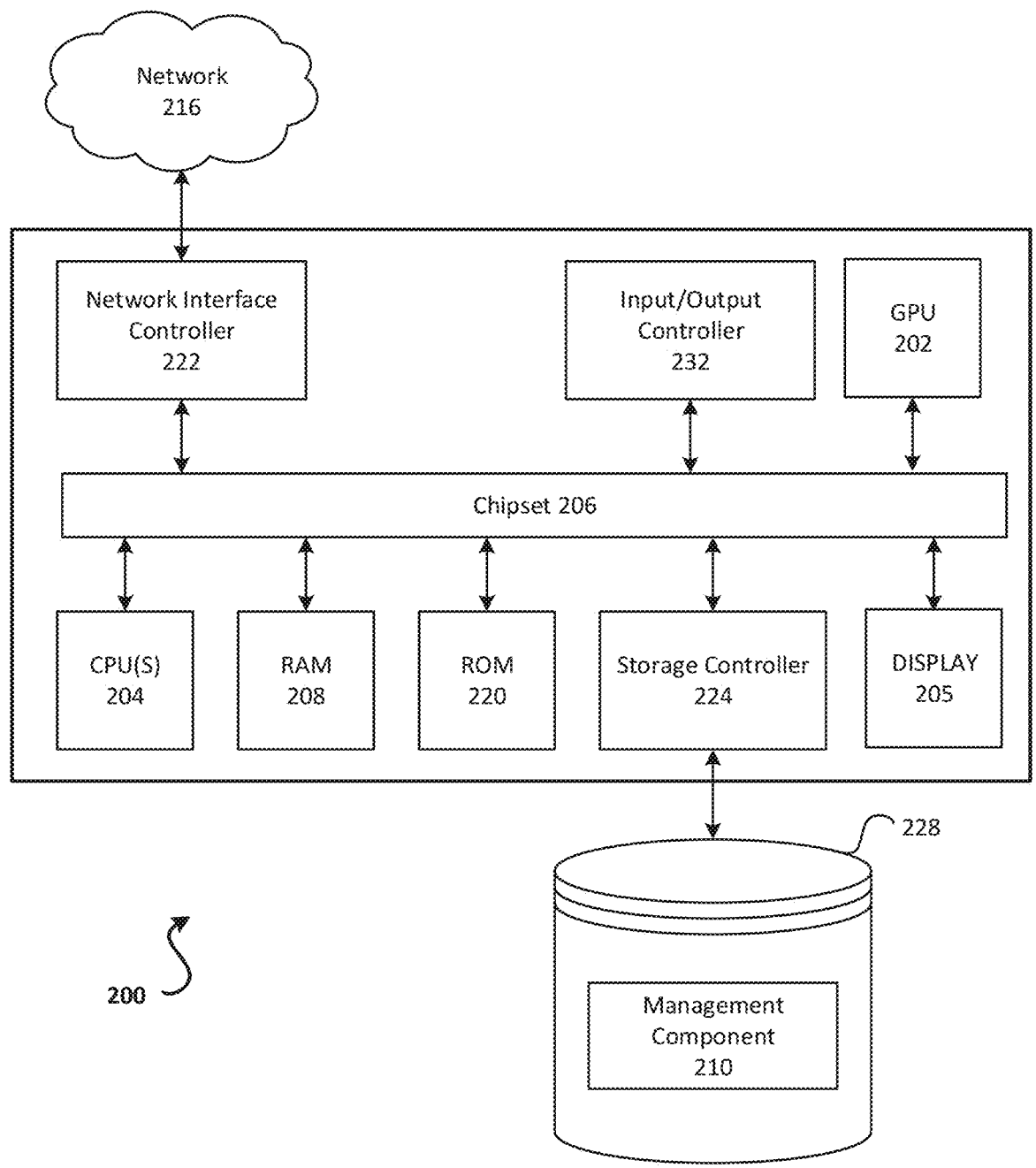
FIG. 2 is a schematic of an exemplary network device in accordance with the present disclosure.

FIG. 2 depicts a computing device that may be used in various aspects, such as the servers, modules, and/or devices depicted in FIG. 1. With regard to the example architecture of FIG. 1, the network support system 120, BOT management system 105, and user device 110 may each be implemented in an instance of a computing device 200 of FIG. 2. The computer architecture shown in FIG. 2 may illustrate a server computer, workstation, desktop computer, laptop, tablet, network appliance, PDA, e-reader, digital cellular phone, or other computing node, and may be utilized to execute any aspects of the computers described herein, such as to implement the methods described herein.

The computing device 200 may include a baseboard, or "motherboard," which is a printed circuit board to which a multitude of components or devices may be connected by way of a system bus or other electrical communication paths. One or more central processing units (CPUs) 204 may operate in conjunction with a chipset 206. The CPU(s) 204 may be standard programmable processors that perform arithmetic and logical operations necessary for the operation of the computing device 200.

The CPU(s) 204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 204 may be augmented with or replaced by other processing units, such as GPU(s) 205. The GPU(s) 205 may comprise processing units specialized for but not necessarily limited to highly parallel computations, such as graphics and other visualization-related processing.

A chipset 206 may provide an interface between the CPU(s) 204 and the remainder of the components and devices on the baseboard. The chipset 206 may provide an interface to a random-access memory (RAM) 208 used as the main memory in the computing device 200. The chipset 206 may further provide an interface to a computer-readable storage medium, such as a read-only memory (ROM) 220 or non-volatile RAM (NVRAM) (not shown), for storing basic routines that may help to start up the computing device 200 and to transfer information between the various components and devices. ROM 220 or NVRAM may also store other software components necessary for the operation of the computing device 200 in accordance with the aspects described herein.

The computing device 200 may operate in a networked environment using logical connections to remote computing nodes and computer systems through local area network (LAN) 216. The chipset 206 may include functionality for providing network connectivity through a network interface controller (NIC) 222, such as a gigabit Ethernet adapter. A NIC 222 may be capable of connecting the computing device 200 to other computing nodes over a network 216. It should be appreciated that multiple NICs 222 may be present in the computing device 200, connecting the computing device to other types of networks and remote computer systems.

The computing device 200 may be connected to a mass storage device 228 that provides non-volatile storage for the computer. The mass storage device 228 may store system programs, application programs, other program modules, and data, which have been described in greater detail herein. The mass storage device 228 may be connected to the computing device 200 through a storage controller 224 connected to the chipset 206. The mass storage device 228 may consist of one or more physical storage units. A storage controller 224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 200 may store data on a mass storage device 228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 228 is characterized as primary or secondary storage and the like.

For example, the computing device 200 may store information to the mass storage device 228 by issuing instructions through a storage controller 224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 200 may further read information from the mass storage device 228 by detecting the physical states or characteristics of one or more particular locations within the physical storage units.

In addition to the mass storage device 228 described above, the computing device 200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 228 depicted in FIG. 2, may store an operating system utilized to control the operation of the computing device 200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 228 may store other system or application programs and data utilized by the computing device 200.

The mass storage device 228 or other computer-readable storage media may also be encoded with computer-executable instructions, which, when loaded into the computing device 200, transforms the computing device from a general-purpose computing system into a special-purpose computer capable of implementing the aspects described herein. These computer-executable instructions transform the computing device 200 by specifying how the CPU(s) 204 transition between states, as described above. The computing device 200 may have access to computer-readable storage media storing computer-executable instructions, which, when executed by the computing device 200, may perform methods described herein.

A computing device, such as the computing device 200 depicted in FIG. 2, may also include an input/output controller 232 for receiving and processing input from a number of input devices, such as a keyboard, a mouse, a touchpad, a touch screen, an electronic stylus, or other type of input device. Similarly, an input/output controller 232 may provide output to a display 205, such as a computer monitor, a flat-panel display, a digital projector, a printer, a plotter, or other type of output device. It will be appreciated that the computing device 200 may not include all of the components shown in FIG. 2, may include other components that are not explicitly shown in FIG. 2, or may utilize an architecture completely different than that shown in FIG. 2.

As described herein, a computing device may be a physical computing device, such as the computing device 200 of FIG. 2. A computing node may also include a virtual machine host process and one or more virtual machine instances. Computer-executable instructions may be executed by the physical hardware of a computing device indirectly through interpretation and/or execution of instructions stored and executed in the context of a virtual machine.

Figure 3:
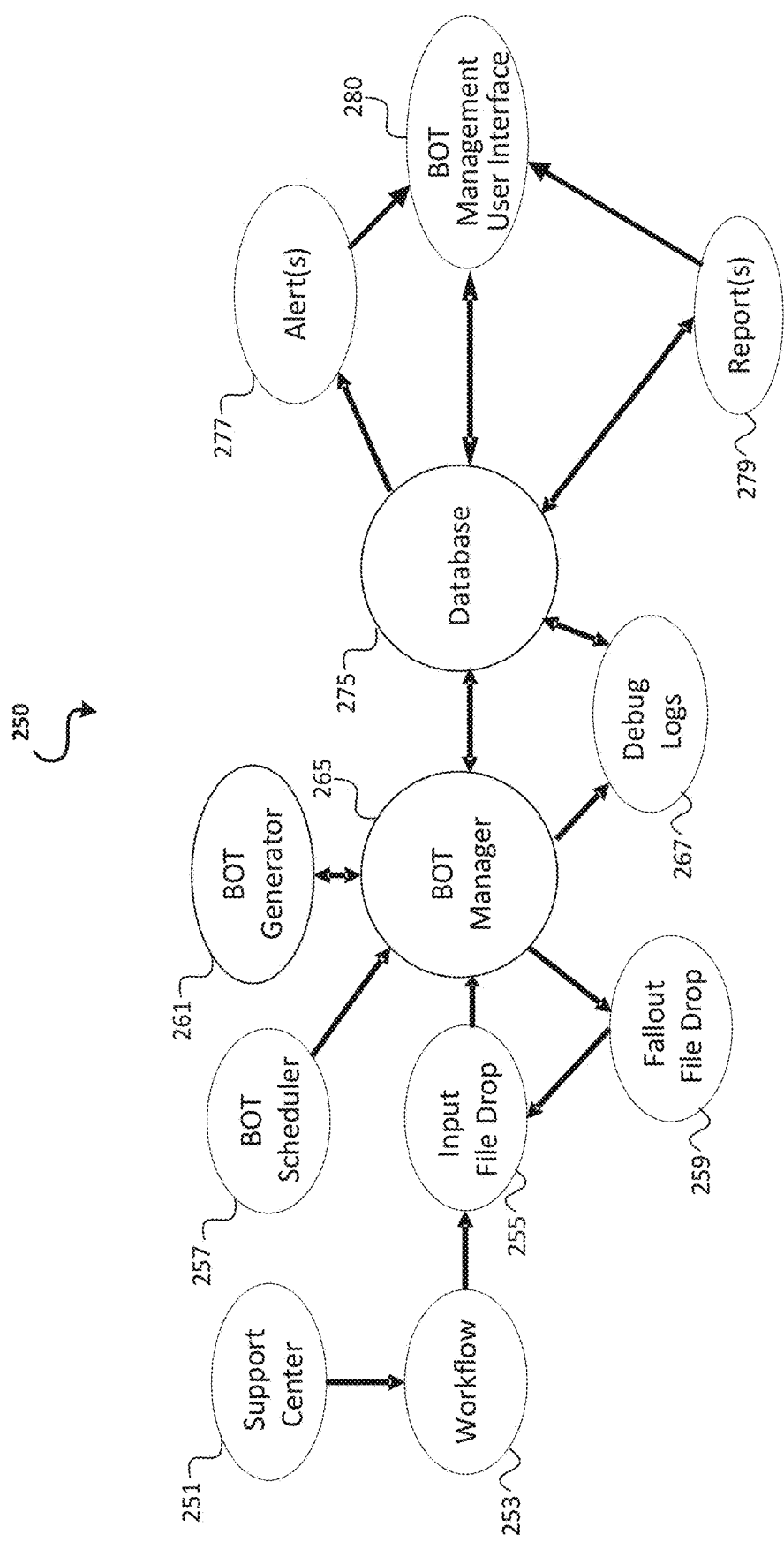
FIG. 3 is a schematic of an exemplary system architecture in accordance with the present disclosure.

FIG. 3 illustrates an exemplary operational diagram 250 for managing RPA BOT processes within a network according to the present disclosure. Network support staff operating at a network support center 251 may oversee (e.g., monitor, analyze, maintain, troubleshoot, or evaluate) a computer network for problems. Based on the oversight of the network, the network support staff may be used to generate one or more workflows 253, which may be used to create work orders, open service tickets, and otherwise schedule technical support for a variety of network devices and systems. The workflows 253 may be sent to an input file drop 255. The input file drop may involve moving a file(s) to the predetermined folder where the file(s) are staged (e.g., at a storage location or drive) pending the BOT retrieval. One or more input files (e.g., a Clarify input file which logs customer ticketing information indicating issues customers may have encountered while using the telecommunications network 101) may be sent from the input file drop 255 to a BOT manager 265. The BOT manager 265 may process the one or more input files. Once the BOT manager 265 processes the one or more input files, the BOT manager 265 may generate BOTs (e.g., a Clarify BOT) via the BOT generator 261 and schedule BOT operations using a BOT scheduler 257. The BOT manager 265 may also manage scheduled BOT operations (e.g., start BOT, stop BOT, schedule BOT, monitor BOT, reboot BOT, update BOT, clear hung session, BOT run record success/fail, how successful is a BOT running, what is causing BOT failures, what is causing a record processing failure, determine whether identify input data is in place, identify whether a hosted virtual disk (HVD) is ready for use, identify whether a HVD is logged into a BOT server, identify whether a BOT is ready to run, identify key performance indicators (KPIs) per BOT, identify errors in real-time, identify record failure causes, identify captured failed records, automate a fallout rerun, perform BOT analytics, debug analytics, and reboot server or HVD). The BOT manager 265 may also transmit failed drop information (e.g., report shows where visitors leave (fallout) and continue through (fall-through) a pre-specified sequence of pages) to fallout file drop 259, which may be considered a KPI. The fallout file drop 259 may transmit fallout information to the input file drop 255, on for example, a periodic basis. The BOT manager 265 may submit to debug logs 267 operations, processes, and errors that occur when the BOTs perform tasks. A database 275 (e.g., a backend database) may send or receive data from the BOT manager 265 (e.g., BOT status update information), debug logs (e.g., per-record BOT success information, average BOT process duration, BOT errors, etc.), or other information related to BOT operations). The database 275 may be used to generate reports 279 (e.g., BOT error reports, BOT performance reports, etc.), which may be created automatically according to a predetermined schedule (e.g., hourly, daily, weekly, etc.) or via a manual request. The database 275 may be used to generate one or more alerts 277 (e.g., email, ticket, messenger, alarm, etc.) in response to a BOT status for one or more BOTs exceeding a predetermined threshold (e.g., a failure rate for a BOT exceeding 25%).

The database 275, the alerts 277, or the reports 279 may be used by the BOT management user interface 280, which may be a GUI, to provide a real-time view of BOTs running, what the BOTs are running, and how well the BOTs are performing. A plurality of dashboards may be accessed and displayed via the BOT management user interface 280. For example, the BOT management user interface 280 may provide at least one of: a dashboard view, real-time BOT status, historical BOT status (e.g., past 24 Hrs.), regression test-based on-demand BOTs, a call driver dashboard, a BOT list (e.g., a list all BOTs with HVDs), a BOT status (e.g. a dashboard listing all jobs or tasks run by the BOTs, an HVD Management dashboard, an HVD capacity management dashboard, a reporting and analytics dashboard, and a setting/admin dashboard. The BOT management user interface 280 may be used to clear BOT conditions, perform a BOT restart, HVD or host machine restart, etc.) in response to encountering a BOT error, a mechanical/HVD error, an API error or other errors, a record failure, BOT failure status, BOT offline status, BOT hung status, etc.

Figure 4:
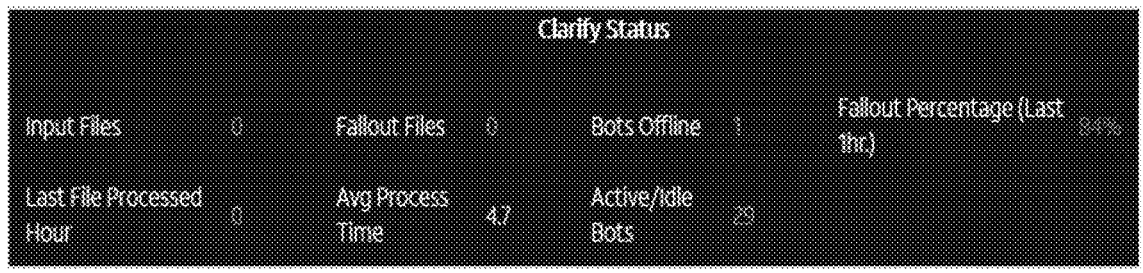
FIG. 4 is an exemplary dashboard in accordance with the present disclosure.
Figure 5:
FIG. 5 is an exemplary dashboard in accordance with the present disclosure.

The BOT management user interface 280 may provide the following information in a variety of dashboards and views:

Dashboard View (see FIGS. 4 and 5) may provide real-time KPIs, an input file count, fallout file count, last processed hour, BOTs offline, active/idle BOTs, fallout percentage (e.g., last hour), color-based threshold alerting, or email KPI alerting and may provide total records in a batch file, success/fail status of each record processed, fallout count, last run time, filename being processed, or HVD processing the file. BOTs may run a same BOT instance (e.g., Clarify BOT instance) on each of a plurality of HVDs (e.g., 30 HVDs).

Figures 6, 7:
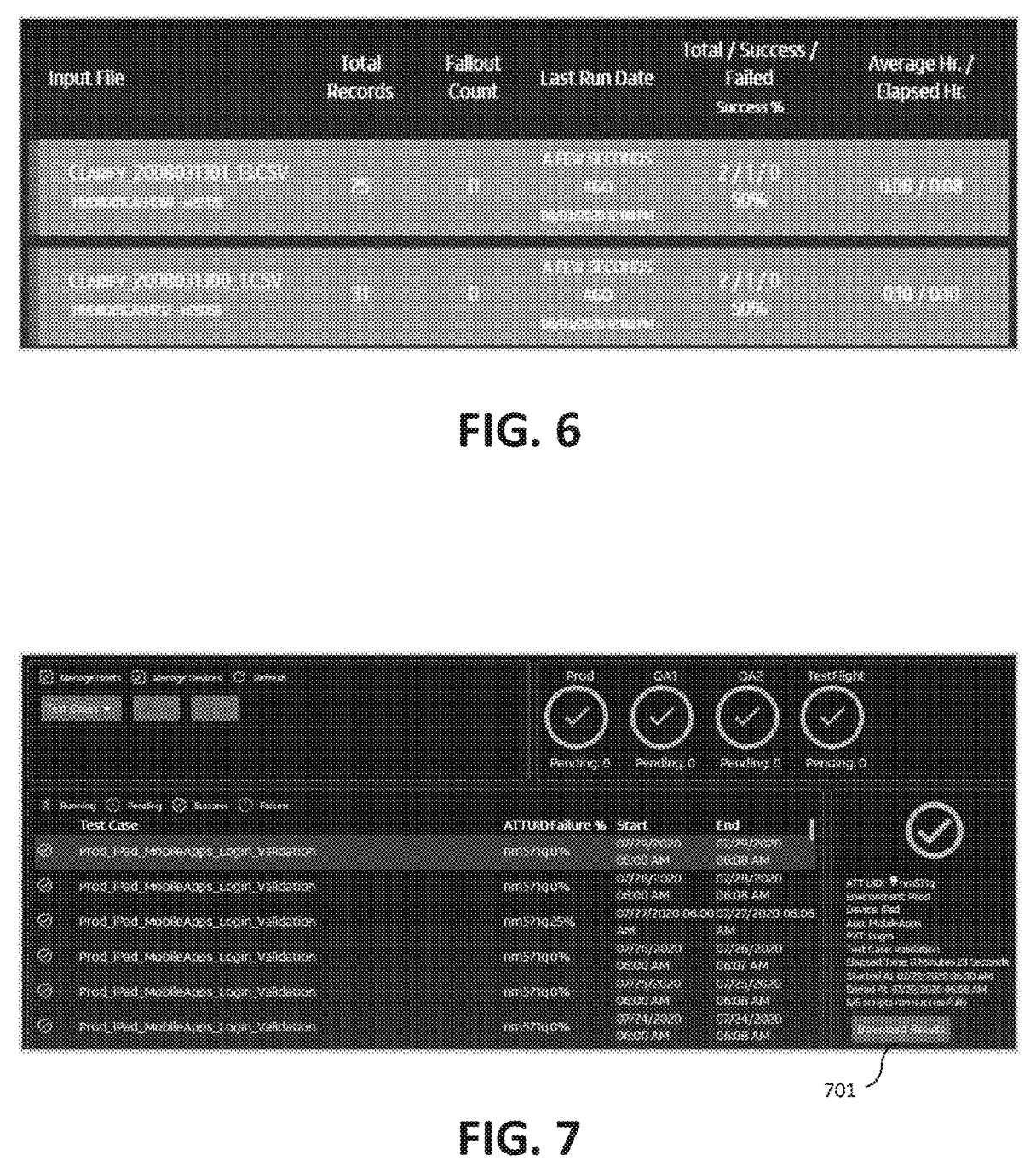

Historical BOT status dashboard (see FIG. 6)—may provide total records in a batch file, success/fail status of each record processed, row color indicator success/fail, fallout count, last run time, filename processed, or HVD processing the file.

Regression test-based on-demand BOT dashboard (see FIG. 7)—may provide management of regression testing on demand including select and start BOT, user ID, start/end, and a historical list of BOT runs, test status delivered in UI, or via text messages, electronic messenger applications, email, real-time page-by-page viewing in the BOT management user interface 280, test results with screenshots downloadable from the BOT management user interface 280. Selection of a test case in this dashboard may allow a user or the BOT management system 105 to select one or more predetermined tests that are run on selected BOT(s). The BOT management system 105 may step through each portion of the selected one or more predetermined test and indicate whether the selected BOT(s) test has run successfully or has failed. If a failure occurs, failure data (e.g., a screen shot of BOT failure data) may be output via the dashboard. This dashboard may also provide a real-time test status and results 701.

Figures 8, 9:
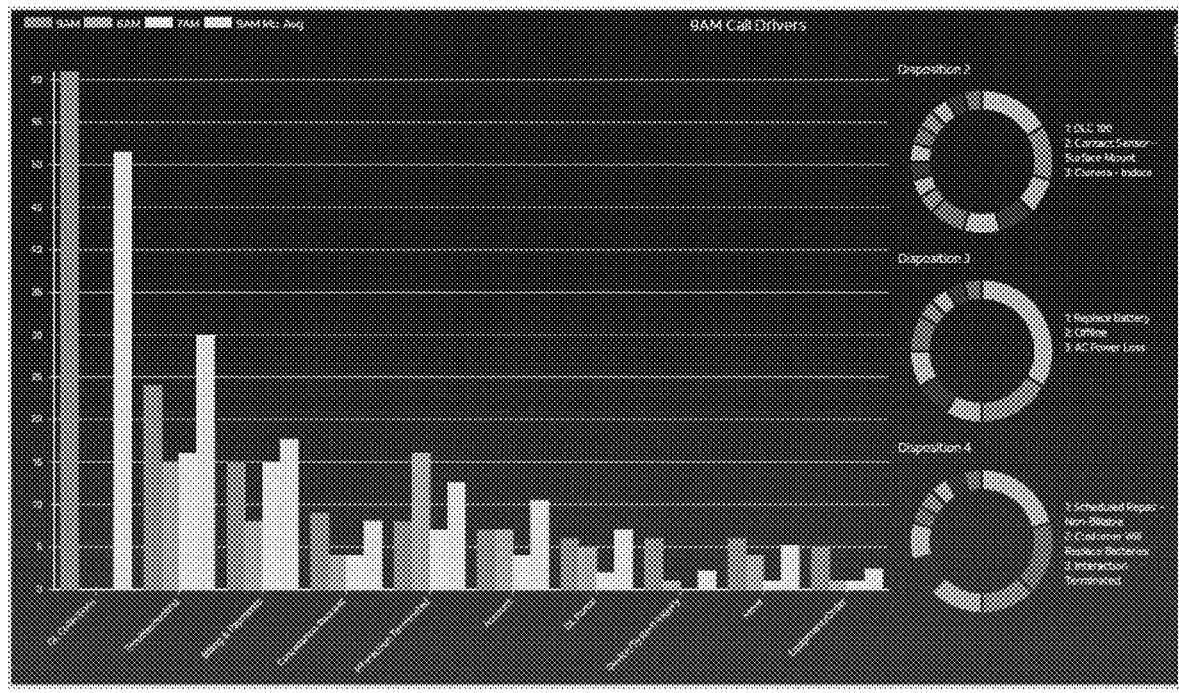
FIG. 8 is an exemplary dashboard in accordance with the present disclosure.
FIG. 9 is an exemplary dashboard in accordance with the present disclosure.

Call driver dashboard (see FIG. 8)—may provide a graphical display (e.g., running data for a previous time-period against monthly average), a multiple disposition view from selected data, or export raw data.

HVD Capacity Management dashboard (see FIG. 9)—may provide a listing of all HVDs with associated MechID, one or more displays indicating a capacity allocated, a monitored capacity, graphical timeline for each day of the week, a display of BOT runs for the previous 7 days graphically, a display of a total available time, a display of free time, a display of total monitored time, a display of total allocated time, or a display of total maintenance time, set/manage BOT run times, or a selectable HVD matrix for a day. Capacity on an HVD may be broken up into time slots (e.g., 15 min slots). For example, if a BOT is identified as requiring two hours to complete a task, the BOT may utilize eight time slots leaving the remainder of the day available. The HVD Capacity Management dashboard may provide a graphical view of scheduled and available timeslots, which may be used for identification and decision making when rescheduling or adding new BOTs to an HVD schedule. Accordingly, this dashboard may provide an indication of HVD underutilization and HVD over utilization, which may be used to add one or more BOTs when the HVD is underutilized or remove one or more BOTs from an HVD when the HVD is over utilized.

Figures 10, 11:
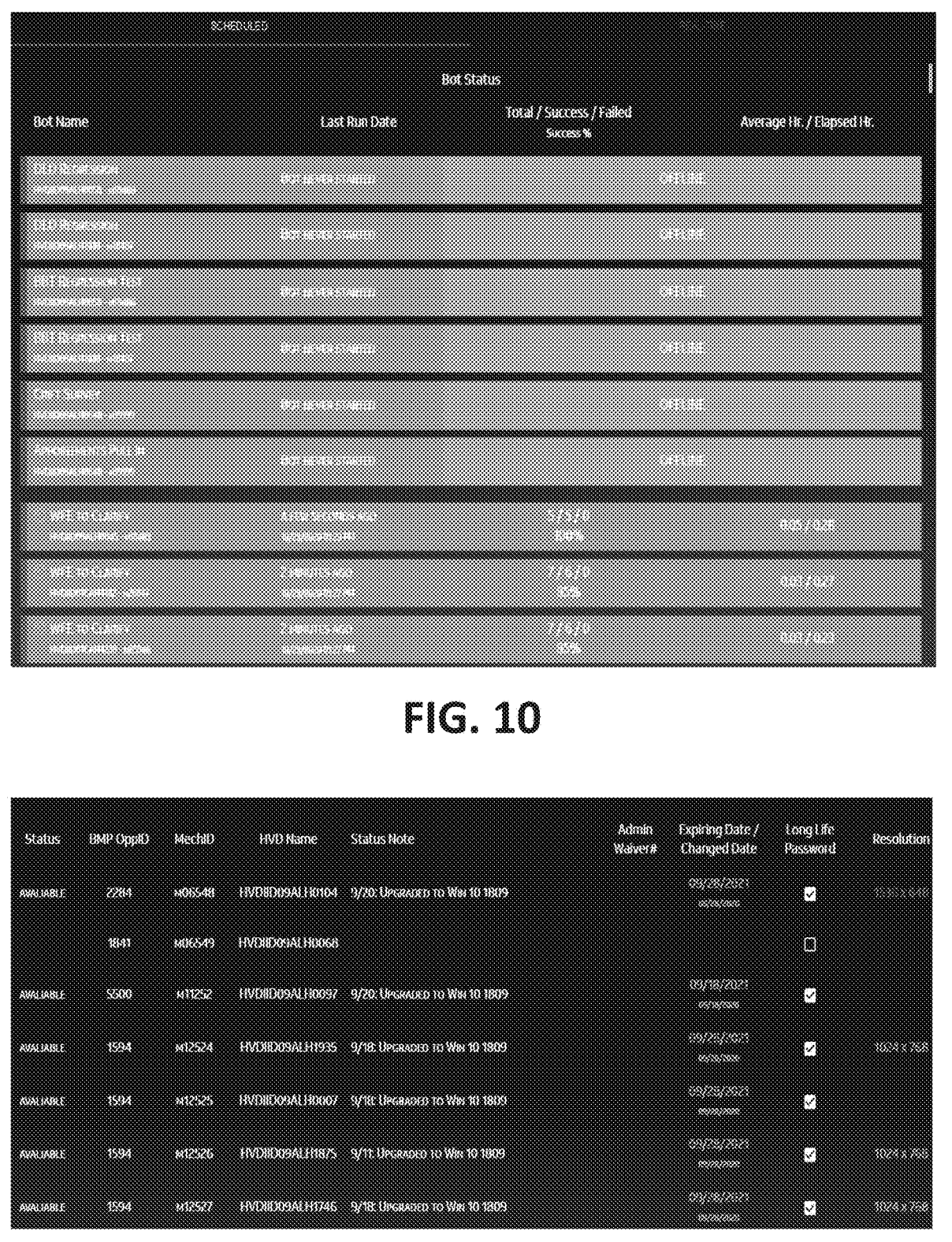

BOT status dashboard (see FIG. 10) may provide current BOTs offline including last run time, current running BOTs, historical BOT runs including total records in batch file, success/fail status of each record processed, last run time, or HVD/Mech processing file.

HVD Management dashboard (see FIG. 11) may provide a listing of all HVDs with associated MechID including a selectable status, an admin waiver, a password change date, a password long life indicator, password expiring email alerts, a status note, or an HVD screen resolution.

Reporting and analytics dashboard (see FIGS. 12-14B) may provide alerts and selectable reports including report for current day, report for yesterday, user selected report, or quarterly BOT run calculation including a report consolidating all runs into a quarterly/yearly view, an RPA dashboard report including HVD/Mech processing, BOT name, success/fail counts, fallout percentage, an average per-record duration, or color-based thresholding, critical BOT debug reports including HVD/Mech processing, a time stamp, a fail point, an error snapshot file name and location, a code line failure, or error debug file name and location, a debug error matrix including total errors by Mech/HVD or a listing all errors that have occurred. For example, in FIG. 12, the BOT management user interface 280 may provide an alert indicating an error cause (e.g., an email address was not available causing a Yoda error to occur when implementing a Yoda conditional statement). In addition to the alert and cause of the error, the BOT management user interface 280 may provide a recommendation action (e.g., clear and restart an HVD or create a trouble ticket) to the technical staff or the BOT management system 105 may perform the recommended action.

Figure 15A:
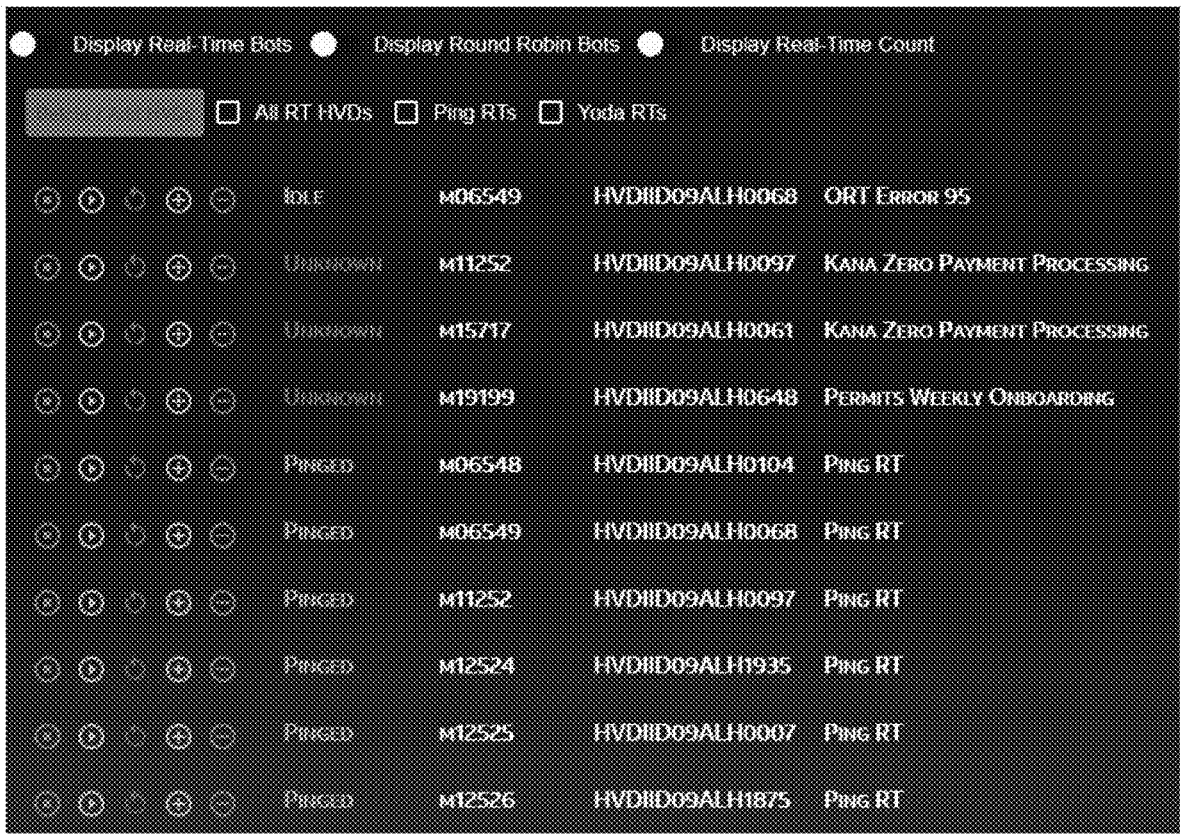
FIG. 15A is an exemplary dashboard in accordance with the present disclosure.

BOT list dashboard (see FIG. 15A) may provide a list all BOTs with an HVD and MechID, last known BOT status, button driven BOT commands including start BOT, stop BOT, reload BOT, enable HVD to BOT runner application program interface (API), or disable HVD to BOT runner API, a toggle button—view state (e.g., real-time BOTs), or a toggle button—view state (e.g., HVDs enabled on BOT runner).

Figure 15B:
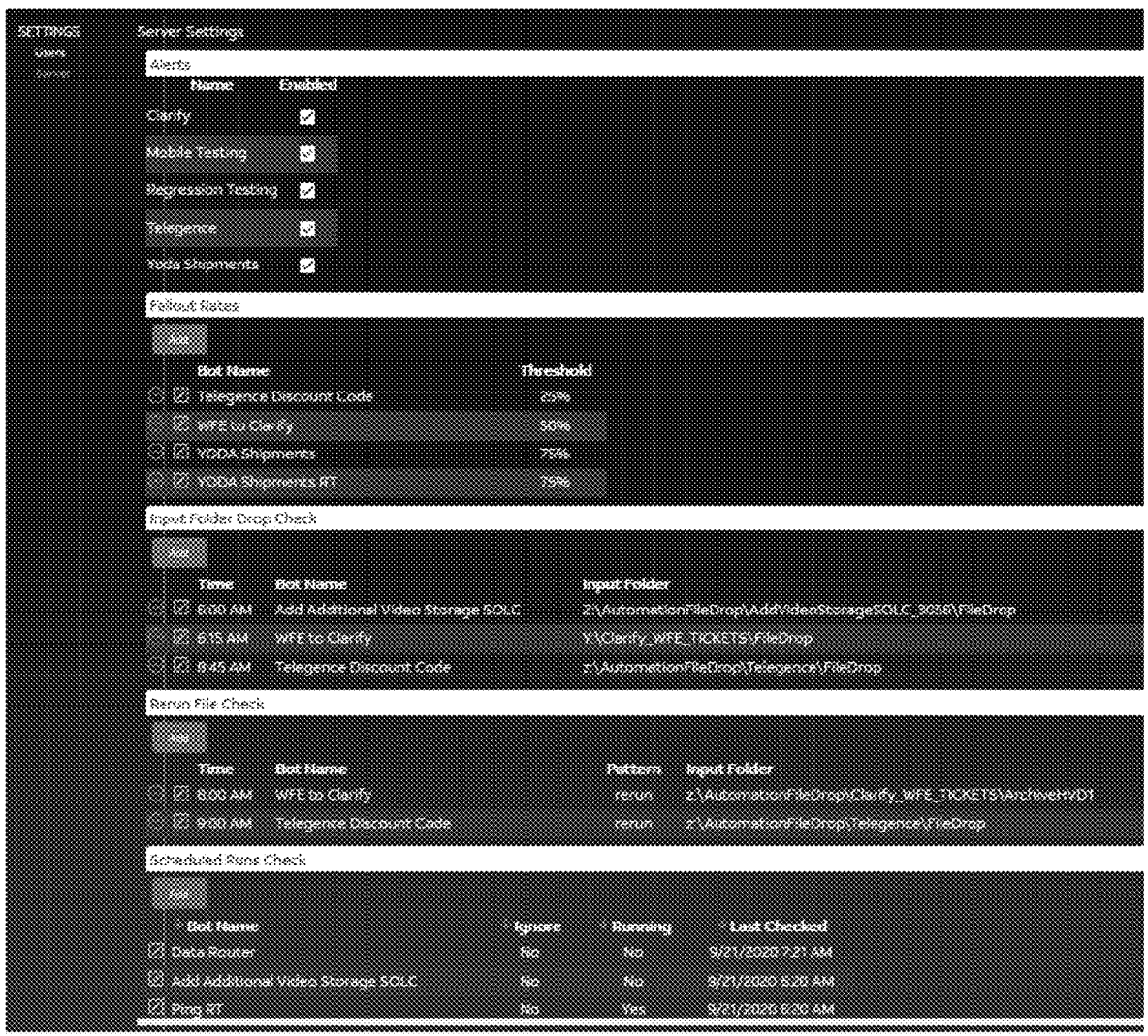
FIG. 15B is an exemplary dashboard in accordance with the present disclosure.
Figure 15C:
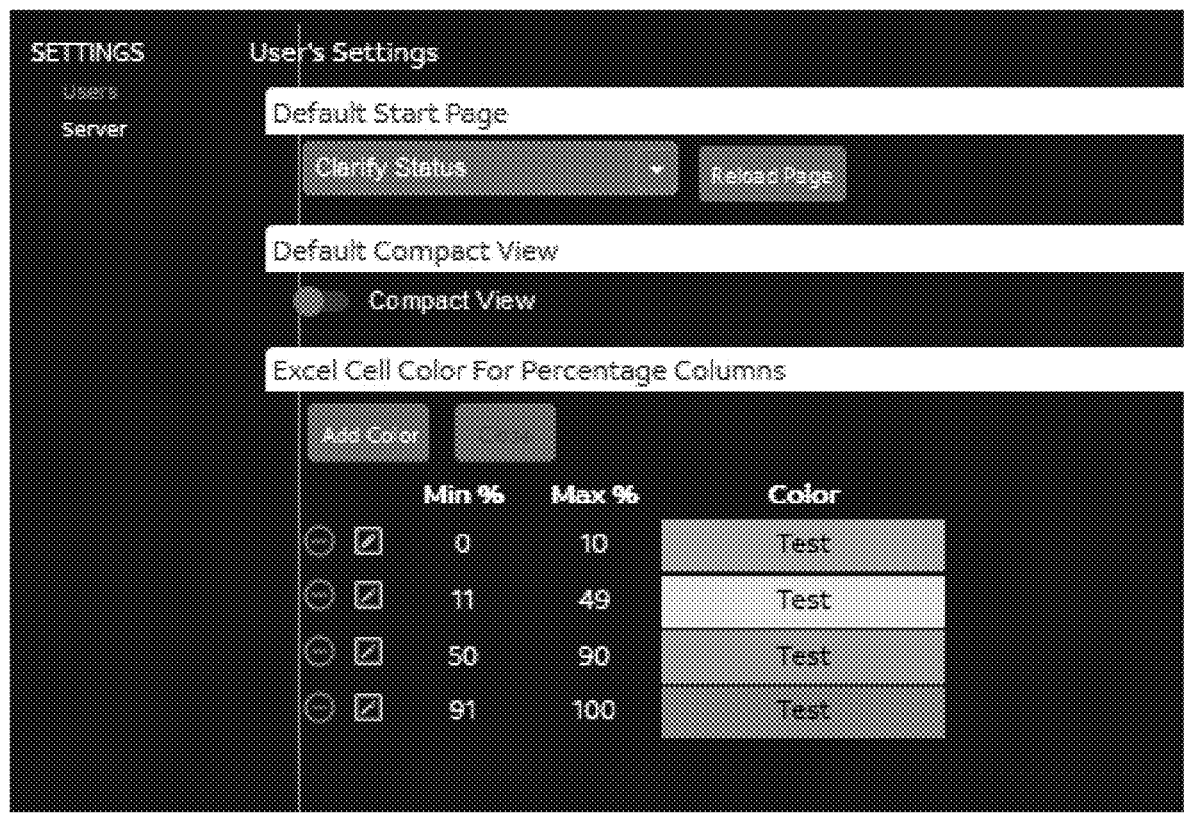
FIG. 15C is an exemplary dashboard in accordance with the present disclosure.

Setting/admin dashboard (see FIGS. 15B and 15C) may provide a user setting page including a default start page, a default compact/expanded view or reporting color-based threshold settings, a server setting page including a fallout threshold setting by BOT, an input folder alert, a rerun file check alert, or scheduled run check alerts. FIG. 15B may be used for server settings and FIG. 15C may be used for user settings associated with a given user.

An exemplary operational flowchart in accordance with a method of the present disclosure is illustrated in FIG. 16, which may be utilized for managing RPA BOT processes within a network. At block 1605, a BOT management system 105 may generate or otherwise deploy one or more BOTs within a telecommunications network. The one or more BOTs may be generated in response to one or more workflows received from a network support system 120. At block 1610, the BOT management system 105 may start the one or more BOTs. For example, the one or more BOTs may provide a start notification in response to a selection of one or more predetermined tests or other tasks via the BOT management system 105.

At block 1615, the BOT management system 105 may update a database in response to sending or receiving data from the BOT manager 265 (e.g., BOT status update information, debug logs, or other information related to BOT operations. For example, the updated data may be related to at least one of: file name and record information associated with the one or more BOTs (e.g., record count information), record successes and failures (e.g., whether or not a record successfully, added, updated, changed) associated with the one or more BOTs, error reports associated with the one or more BOTs (e.g., a report indicating that a clarify window could not be found causing the one or more BOTs to drop a record in a file to be rerun (fallout), closing applications, and causing the one or more BOTs to use a next record in the file), or an end of file associated with the one or more BOTs.

At block 1620, the BOT management system 105 may analyze status information associated with the one or more BOTs. The status information may be related to real-time statuses, historical statuses, test statuses, last known status, success/fail status, HVD status, etc. At block 1625, the BOT management system 105 may provide the status information associated with the one or more BOTs via a BOT management dashboard. At block 1630, the BOT management system 105 may manage the one or more BOTs based on the analysis performed at block 1620 or via input received through the BOT management dashboard. The management of the one or more BOTs may include performing one or more actions on the one or more BOTs or telecommunications network (e.g., start Bot, stop BOT, schedule BOT, monitor BOT, reboot BOT, update BOT, clear hung session, BOT run record success/fail, how successful is a BOT running, what is causing bot failures, what is causing a record processing failure, determine whether identify input data is in place, identify whether a hosted virtual disk (HVD) is ready for use, identify whether a HVD is logged into a BOT server, identify whether a BOT is ready to run, identify key performance indicators (KPIs) per BOT, identify errors in real-time, identify record failure causes, identify captured failed records, automate a fallout rerun (KPI), perform BOT analytics, debug analytics, and reboot server or HVD).

Accordingly, the present disclosure provides a system that may monitor and implement robotic process automation (RPA) BOTs. The system may communicate with a backend database and user interface to create an end-to-end communication that provides insight into quality, quantity, success/failure, start/stop, and errors of RPA BOT processes. The system may manage the RPA BOTs and cause the RPA BOTs to perform one or more tasks or actions. By monitoring and managing the RPA BOTs, may occur in real-time, the system may identify BOT failures, BOT interruptions, BOT under-utilization, BOT over utilization, poor BOT performance, etc., which may be used for troubleshooting and reporting associated with the RPA BOTs. Using the identification, the system may address potential or actual delays in or failures to a telecommunications network in order to maintain or improve telecommunications network performance.

Figure 17:
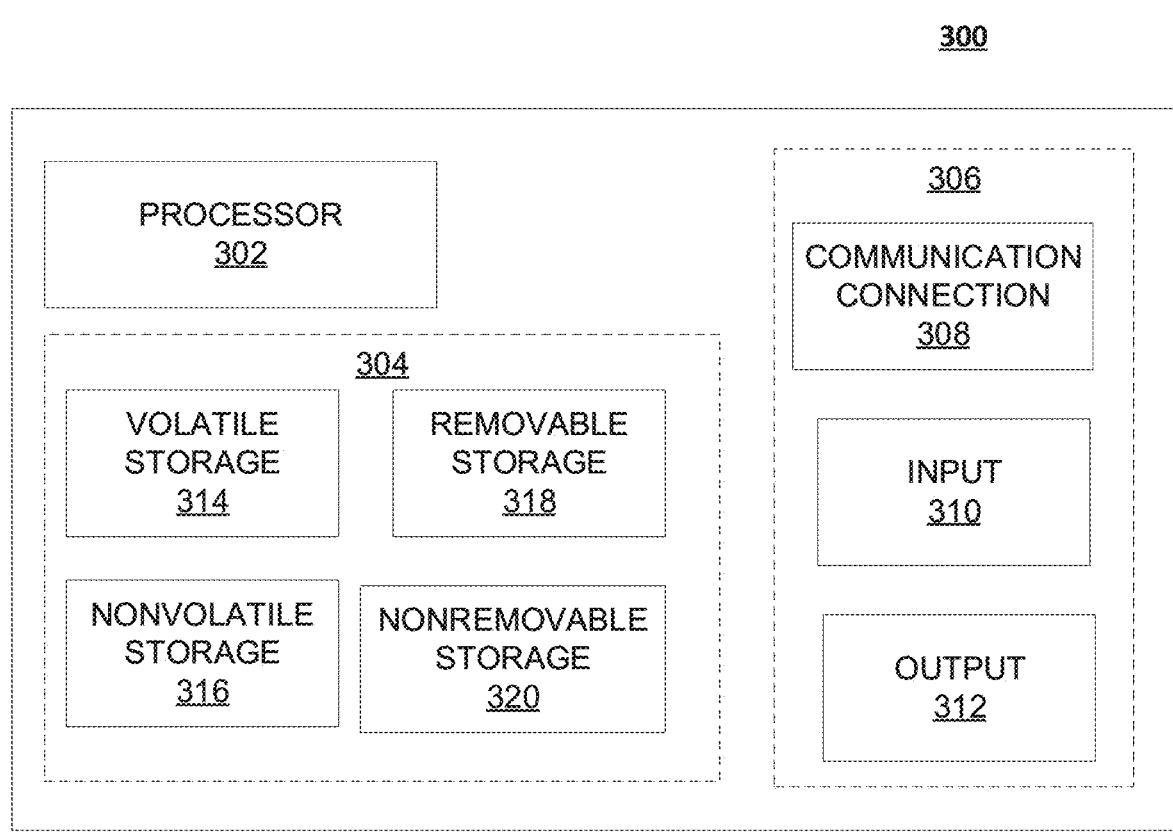
FIG. 17 is a schematic of an exemplary network device.

FIG. 17 is a block diagram of network device 300 that may be connected to or comprise a component of edge computing node or connected to edge computing node via a network. Network device 300 may comprise hardware or a combination of hardware and software. The functionality to facilitate telecommunications via a telecommunications network may reside in one or combination of network devices 300. Network device 300 depicted in FIG. 17 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 17 is exemplary and not intended to imply a limitation to a specific implementation or configuration. Thus, network device 300 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 17) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 18:
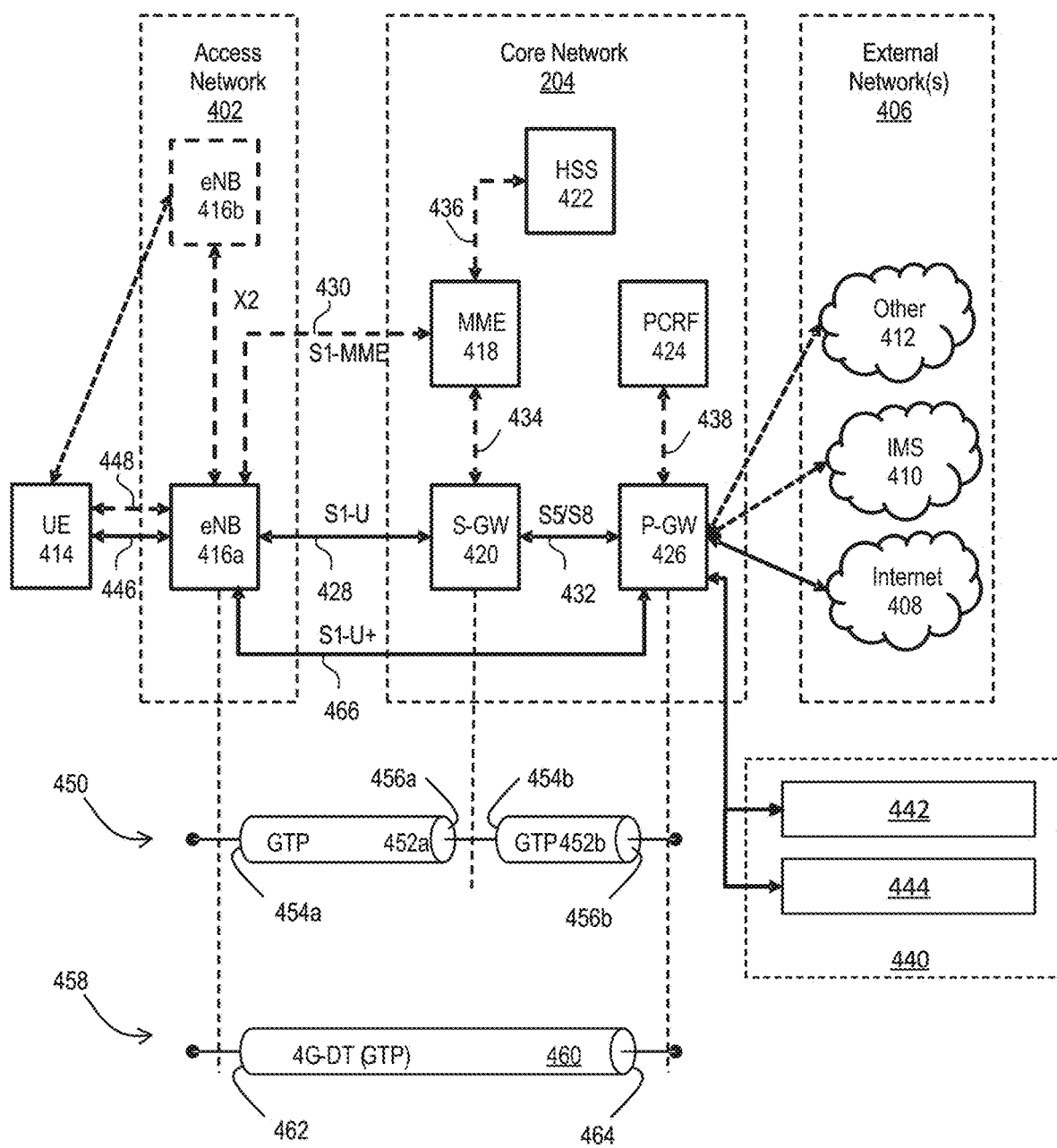
FIG. 18 depicts an exemplary communication system that provide wireless telecommunication services over wireless communication networks with which edge computing node may communicate.

FIG. 18 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416*a*, 416*b*. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory or disk drive. It is understood that storage device 440 can include registers suitable for storing address values. Alternatively or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 18. In other words, either or both of access network 402 and the core network 404 can include additional network elements that are not shown, such as various routers, switches, and controllers. In addition, although FIG. 18 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 18. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 19:
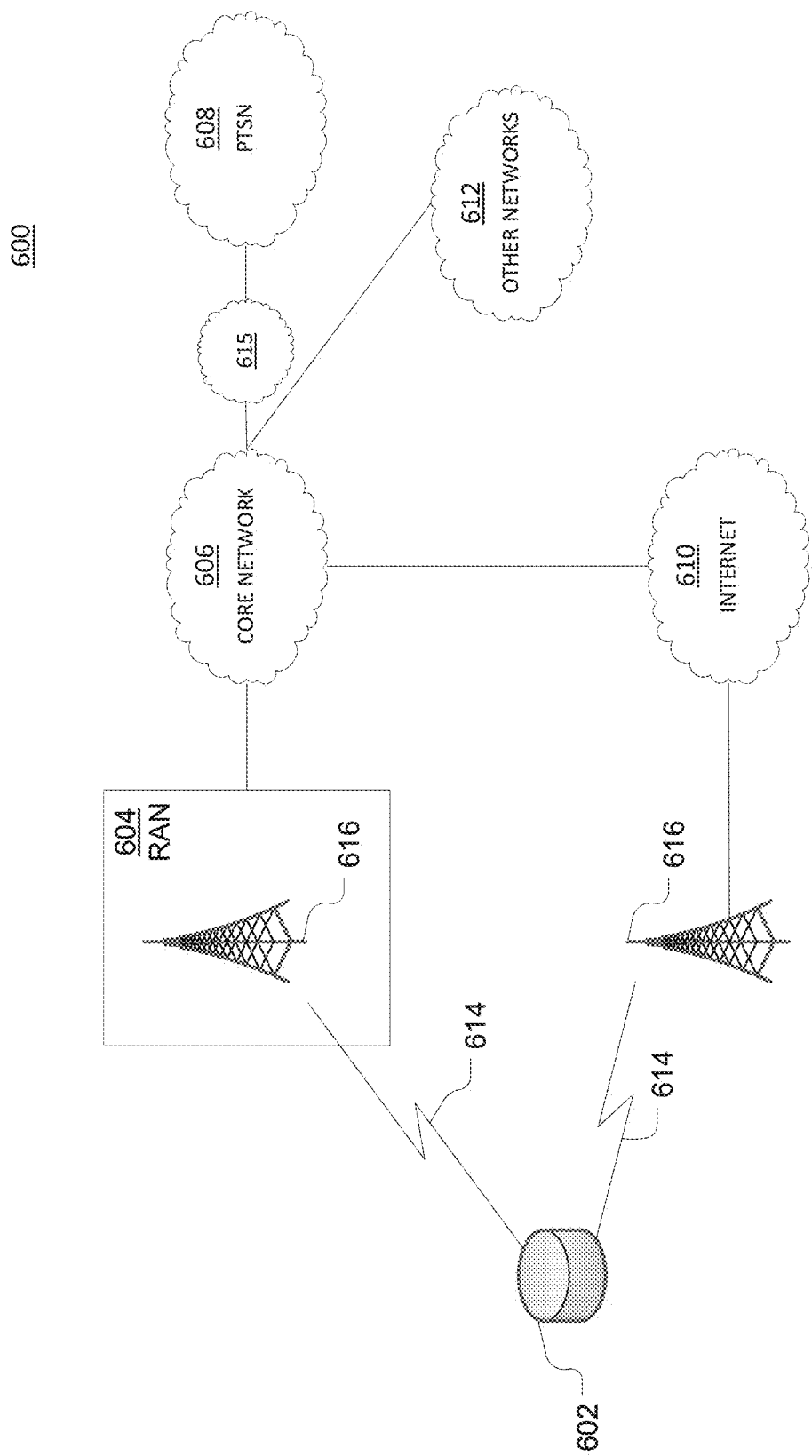
FIG. 19 depicts an exemplary communication system that provide wireless telecommunication services over wireless communication networks with which edge computing node may communicate.

As shown in FIG. 19, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, mobile devices 33, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Figure 20:
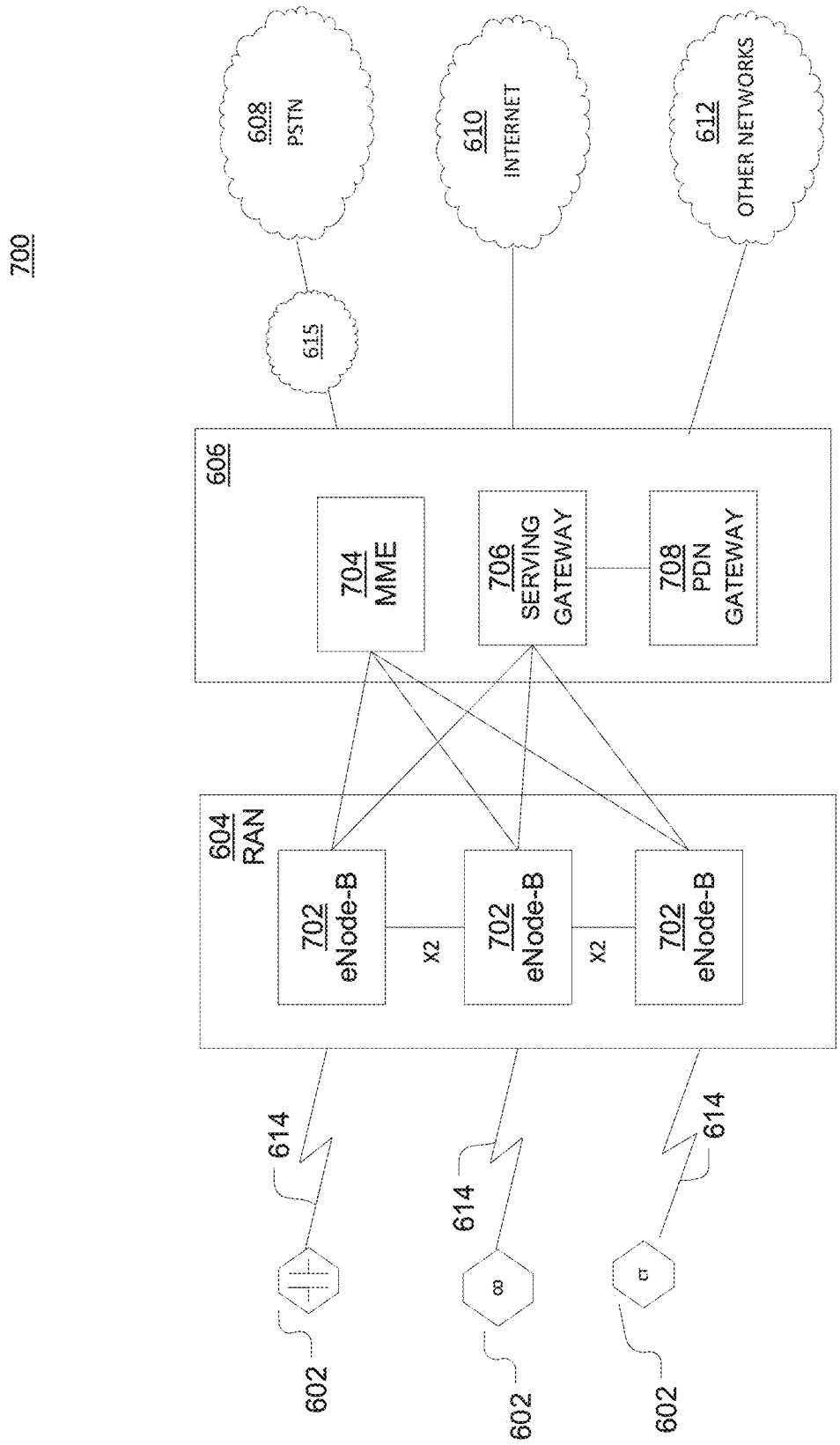
FIG. 20 is an example system diagram of a radio access network and a core network with which edge computing node may communicate.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 20, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 20, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

FIG. 20 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNodeBs 702 while remaining consistent with the disclosed technology. One or more eNodeBs 702 may include one or more transceivers for communicating with the WTRUs 602 over air interface 614. Optionally, eNodeBs 702 may implement MIMO technology. Thus, one of eNodeBs 702, for example, may use multiple antennas to transmit wireless signals to, or receive wireless signals from, one of WTRUs 602.

Each of eNodeBs 702 may be associated with a particular cell (not shown) and may be configured to handle radio resource management decisions, handover decisions, scheduling of users in the uplink or downlink, or the like. As shown in FIG. 21 eNodeBs 702 may communicate with one another over an X2 interface.

Core network 606 shown in FIG. 21 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNodeBs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNodeBs 702 in RAN 604 via the S1 interface. Serving gateway 706 may generally route or forward user data packets to or from the WTRUs 602. Serving gateway 706 may also perform other functions, such as anchoring user planes during inter-eNodeB handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims. The term "or" as used herein is inclusive, unless provided otherwise.

The invention claimed is:

1. A device, comprising:
a processor; and
a memory coupled with the processor, the memory storing executable instructions that, when executed by the processor, cause the processor to effectuate operations comprising:
obtaining, from a network support system associated with a telecommunications network, workflow information that identifies network resources associated with a process of the telecommunications network;
deploying, based on the workflow information, one or more robotic process automation (RPA) BOTs in the telecommunications network, wherein the workflow information is generated and included in a flat file transmitted by the network support system to the device, and wherein the workflow information instructs the one or more RPA BOTs to obtain diagnostic information regarding the telecommunications network;
gathering RPA BOT performance data associated with a performance of the one or more RPA BOTs using virtual machines deployed in the telecommunications network;
updating, for the one or more RPA BOTs, a database with RPA BOT information comprising the RPA BOT performance data;
analyzing a status of the one or more RPA BOTs based on the updating the database;
managing the one or more RPA BOTs based on the status, wherein the managing includes starting, stopping, or rebooting an RPA BOT in the telecommunications network based on the status; and
providing a graphical user interface for facilitating further management of the one or more RPA BOTs, wherein the graphical user interface provides selectable options for on demand regression testing management of the one or more RPA bots, wherein the selectable options include options for predetermined tests to run for the one or more RPA bots, wherein the graphical user interface further enables defining of fallout threshold settings associated with each of the one or more RPA BOTs and provides statistics on fallout, and wherein the statistics include fallout count and fallout percentage over a predefined period of time.

2. The device of claim 1, wherein the managing the one or more RPA BOTs further effectuates operations comprising performing one or more actions on the telecommunications network or the one or more RPA BOTs, wherein the obtaining the workflow information comprises obtaining the workflow information from an input file drop, and wherein the operations further comprise providing fallout information to a fallout file drop for transmission to the input file drop.

3. The device of claim 2, wherein the one or more actions comprise identifying a BOT failure cause, identifying a record processing failure cause, or identifying whether a hosted virtual disk (HVD) is ready for use.

4. The device of claim 1, wherein the managing the one or more RPA BOTs further effectuates operations comprising providing one or more alerts based on the analyzing the status of the one or more RPA BOTs, conducting hosted virtual disk management, or providing reporting and analytics based on the analyzing the status of the one or more RPA BOTs.

5. The device of claim 1, wherein the operations further comprise identifying whether a hosted virtual disk (HVD) is ready for use, wherein the graphical user interface further provides a listing of multiple HVDs being monitored, information regarding a monitored capacity of each HVD of the multiple HVDs, and a schedule identifying scheduled and available timeslots for the monitored capacity of each HVD of the multiple HVDs, and wherein at least some of the one or more RPA BOTs are schedulable to a given HVD of the multiple HVDs according to the schedule thereof for maintenance so as to avoid HVD underutilization or overutilization.

6. The device of claim 1, wherein the analyzing the status of the one or more RPA BOTs further effectuates operations comprising comparing the RPA BOT information to at least one service level agreement (SLA).

7. The device of claim 6, wherein the operations further comprise determining a performance of the one or more RPA BOTs based on the comparing the RPA BOT information to the at least one SLA.

8. A computer-implemented method comprising:
obtaining, from a network support system associated with a telecommunications network, workflow information that identifies network resources associated with a process of the telecommunications network;
deploying, based on the workflow information, one or more robotic process automation (RPA) BOTs in the telecommunications network, wherein the workflow information instructs the one or more RPA BOTs to obtain diagnostic information regarding the telecommunications network, and wherein the workflow information is generated and included in a flat file transmitted by the network support system;
gathering RPA BOT performance data associated with a performance of the one or more RPA BOTs using virtual machines deployed in the telecommunications network;
updating, for the one or more RPA BOTs, a database with BOT information comprising the RPA BOT performance data;
analyzing a status of the one or more RPA BOTs based on the updating the database;
managing the one or more RPA BOTs based on the status, wherein the managing includes starting an RPA BOT in the telecommunications network based on the status; and
providing a graphical user interface for facilitating further management of the one or more RPA BOTs, wherein the graphical user interface provides selectable options for on demand regression testing management of the one or more RPA bots, wherein the selectable options include options for predetermined tests to run for the one or more RPA bots, wherein the graphical user interface further enables defining of fallout threshold settings associated with each of the one or more RPA BOTs and provides statistics on fallout, and wherein the statistics include fallout count and fallout percentage over a predefined period of time.

9. The computer-implemented method of claim 8, wherein the managing the one or more RPA BOTs further effectuates operations comprising performing one or more actions on the telecommunications network or the one or more RPA BOTs, wherein the obtaining the workflow information comprises obtaining the workflow information from an input file drop, and wherein the method further comprises providing fallout information to a fallout file drop for transmission to the input file drop.

10. The computer-implemented method of claim 9, wherein the one or more actions comprise identifying a BOT failure cause, identifying a record processing failure cause, or identifying whether a hosted virtual disk (HVD) is ready for use.

11. The computer-implemented method of claim 8, wherein the managing the one or more RPA BOTs further effectuates operations comprising providing one or more alerts based on the analyzing the status of the one or more RPA BOTs, conducting hosted virtual disk management, or providing reporting and analytics based on the analyzing the status of the one or more RPA BOTs.

12. The computer-implemented method of claim 8, further comprising identifying whether a hosted virtual disk (HVD) is ready for use, wherein the graphical user interface further provides a listing of multiple HVDs being monitored, information regarding a monitored capacity of each HVD of the multiple HVDs, and a schedule identifying scheduled and available timeslots for the monitored capacity of each HVD of the multiple HVDs, and wherein at least some of the one or more RPA BOTS are schedulable to a given HVD of the multiple HVDs according to the schedule thereof for maintenance so as to avoid HVD underutilization or overutilization.

13. The computer-implemented method of claim 8, wherein the analyzing the status of the one or more RPA BOTs further effectuates operations comprising comparing the BOT information to at least one service level agreement (SLA).

14. The computer-implemented method of claim 13 further comprising determining a performance of the one or more RPA BOTs based on the comparing the BOT information to the at least one SLA.

15. A system comprising:
a user device, wherein the user device comprises a graphical user interface; and
a management system comprising:
a processor; and
a memory coupled with the processor, the memory storing executable instructions that, when executed by the processor, cause the processor to effectuate operations comprising:
obtaining, from a network support system associated with a telecommunications network, workflow information that identifies network resources associated with a process of the telecommunications network;
deploying, based on the workflow information, one or more robotic process automation (RPA) BOTs in the telecommunications network, wherein the workflow information instructs the one or more RPA BOTs to obtain diagnostic information regarding the telecommunications network, wherein the workflow information is generated and included in a flat file transmitted by the network support system;

gathering RPA BOT performance data associated with a performance of the one or more RPA BOTs using virtual machines deployed in the telecommunications network;

updating, for the one or more RPA BOTs, a database with RPA BOT information comprising the RPA BOT performance data;

analyzing a status of the one or more RPA BOTs based on the updating the database;

managing the one or more RPA BOTs based on the status using the user device, wherein the managing includes stopping an RPA BOT in the telecommunications network based on the status; and providing the graphical user interface to the user device for facilitating further management of the one or more RPA BOTs, wherein the graphical user interface provides selectable options for on demand regression testing management of the one or more RPA bots, wherein the selectable options include options for predetermined tests to run for the one or more RPA bots, wherein the graphical user interface further enables defining of fallout threshold settings associated with each of the one or more RPA BOTs and provides statistics on fallout, and wherein the statistics include fallout count and fallout percentage over a predefined period of time.

16. The system of claim 15, wherein the managing the one or more RPA BOTs further effectuates operations comprising performing one or more actions on the telecommunications network or the one or more RPA BOTs, wherein the obtaining the workflow information comprises obtaining the workflow information from an input file drop, and wherein the operations further comprise providing fallout information to a fallout file drop for transmission to the input file drop.

17. The system of claim 16, wherein the one or more actions comprise identifying a BOT failure cause, identifying a record processing failure cause, and identifying whether a hosted virtual disk (HVD) is ready for use, wherein the graphical user interface further provides a listing of multiple HVDs being monitored, information regarding a monitored capacity of each HVD of the multiple HVDs, and a schedule identifying scheduled and available timeslots for the monitored capacity of each HVD of the multiple HVDs, and wherein at least some of the one or more RPA BOTs are schedulable to a given HVD of the multiple HVDs according to the schedule thereof for maintenance so as to avoid HVD underutilization or overutilization.

18. The system of claim 15, wherein the managing the one or more RPA BOTs further effectuates operations comprising providing one or more alerts based on the analyzing the status of the one or more RPA BOTs, conducting hosted virtual disk (HVD) management, or providing reporting and analytics based on the analyzing the status of the one or more RPA BOTs.

19. The system of claim 15, wherein the analyzing the status of the one or more RPA BOTs further effectuates operations comprising comparing the RPA BOT information to at least one service level agreement (SLA).

20. The system of claim 19, wherein the operations further comprise determining a performance of the one or more RPA BOTs based on the comparing the RPA BOT information to the at least one SLA.

\* \* \* \* \*